US006119566A

United States Patent [19]

Yan et al.

[11] Patent Number: 6,119,566

[45] Date of Patent: Sep. 19, 2000

[54] MULTI-PIECE FOOD SLICER GAUGE PLATE AND ASSOCIATED METHOD

[75] Inventors: Gongpu Yan, Troy; Ellis Gale Short, Sidney, both of Ohio

[73] Assignee: Premark FEG L.L.C., Wilmington, Del.

[21] Appl. No.: 09/244,740

[22] Filed: Feb. 5, 1999

Related U.S. Application Data

[63] Continuation-in-part of application No. 08/915,200, Aug. 15, 1997, Pat. No. 5,970,840.

[60] Provisional application No. 60/023,668, Aug. 15, 1996.

[51] Int. Cl.[7] .............................. B23D 19/00; B26D 7/06

[52] U.S. Cl. .............................. 83/13; 83/421; 83/468.7; 83/717; 83/932

[58] Field of Search .............................. 83/717, 915.5, 83/421, 468.7, 713, 932; 451/422

[56] References Cited

U.S. PATENT DOCUMENTS

| | | | |
|---|---|---|---|
| 259,883 | 7/1882 | Engebretsen | D15/97 |
| 1,889,541 | 11/1932 | Campbell | 83/713 |
| 1,965,867 | 7/1934 | Peddicord | 83/713 |
| 1,972,254 | 1/1934 | Wood | 146/102 |
| 1,993,849 | 3/1935 | Lucey | 146/102 |
| 2,001,769 | 5/1935 | Campbell | 83/713 |
| 2,004,603 | 6/1935 | Folk | 146/102 |
| 2,043,850 | 6/1936 | Folk | 83/713 |
| 2,050,786 | 8/1936 | Folk | 83/713 |
| 2,086,759 | 7/1937 | Wood | 146/102 |
| 2,338,139 | 1/1944 | Slayton | 83/717 |
| 2,563,539 | 10/1951 | Van Duyn | 146/102 |
| 2,573,630 | 10/1951 | Van Duyn | 146/102 |
| 2,598,739 | 6/1952 | Zimmermann | 83/717 |
| 2,598,740 | 6/1952 | Zimmerman | 146/102 |
| 2,663,341 | 12/1953 | Grove | 146/102 |
| 2,682,289 | 6/1954 | Brown | 146/102 |
| 2,691,397 | 10/1954 | Klingens | 83/717 |
| 2,691,398 | 10/1954 | Klingens | 146/717 |
| 2,822,011 | 2/1958 | Lundell | 146/102 |
| 2,970,625 | 3/1961 | Lundell | 146/102 |
| 3,051,207 | 8/1962 | Hartley | 146/102 |
| 3,319,681 | 5/1967 | Anecki | 83/713 |
| 3,613,754 | 10/1971 | Harley | 146/102 |
| 3,672,420 | 6/1972 | Harley et al. | 146/182 |
| 3,704,736 | 12/1972 | Pratley | 83/397 |
| 3,857,310 | 12/1974 | Tiby | 83/26 |
| 3,958,478 | 5/1976 | Camper | 83/174 |
| 3,986,304 | 10/1976 | Shie, III | 83/174 |
| 4,227,656 | 10/1980 | Engebretsen | 241/93 |
| 4,397,206 | 8/1983 | Czala | 83/399 |
| 4,434,694 | 3/1984 | Scharsig | 83/411 |
| 4,813,316 | 3/1989 | Johnson et al. | 83/42 |
| 5,101,704 | 4/1992 | Jones et al. | 83/174 |
| 5,148,729 | 9/1992 | Krumdieck | 83/411.1 |
| 5,188,011 | 2/1993 | Somal et al. | 83/478 |
| 5,224,407 | 7/1993 | Koch et al. | 83/468.7 |
| 5,509,337 | 4/1996 | Norman et al. | 83/546 |
| 5,666,866 | 9/1997 | Huang et al. | 83/77 |
| 5,687,626 | 11/1997 | Scherch et al. | 83/719 |

*Primary Examiner*—M. Rachuba
*Assistant Examiner*—Sean Pryor
*Attorney, Agent, or Firm*—Thompson Hine & Flory LLP

[57] ABSTRACT

A gauge plate assembly for a food slicer includes a first plate including a food product contacting side and an attachment side. The attachment side has a plurality of fixed mount studs extending therefrom in an established arrangement, the mount studs attached to the first plate in a non-through manner. A support plate includes a mount side which faces the attachment side of the first plate and has a plurality of stud receiving openings in a mirror image of the established arrangement of the plurality of mount studs for alignment therewith. The attachment side of the first plate is positioned adjacent the mount side of the support plate with the plurality of mount studs inserted within the plurality of stud receiving openings. The studs are secured within the stud receiving openings in a press fit engagement in order to hold the two plate together. This arrangement provides an assembled gauge plate which does not require protruding fasteners to be machined or sealed and otherwise reduces assembly costs.

21 Claims, 6 Drawing Sheets

MULTI-PIECE FOOD SLICER GAUGE PLATE AND ASSOCIATED METHOD

CROSS-REFERENCE TO RELATED APPLICATIONS

This application is a continuation-in-part of U.S. application Ser. No. 08/915,200 filed Aug. 15, 1997, now U.S. Pat. No. 5,970,840 claiming the benefit of U.S. Provisional Application No. 60/023,668, filed Aug. 15, 1996.

BACKGROUND OF THE INVENTION

The present invention relates generally to food slicers and, more particularly, to a food slicer gauge plate the front and back portions of which are attached in an improved manner.

Typical reciprocating food slicers have a rotatable, circular or disc-like slicing blade, a carriage for supporting the food as it is moved past the cutting edge of the slicing knife, and a gauge plate against which a surface of the food product lies for determining a thickness to be sliced therefrom upon movement past the slicing knife.

The gauge plate is situated along one edge of the knife. It is laterally movable with respect to the knife for determining the thickness of the slices to be cut. The gauge plate is mounted on the base of the slicer parallel to the face of the knife.

In conventional slicers, the portions of the gauge plate were connected to each other by means of screws. Therefore, holes were required to be drilled in all portions of the plate. This is disadvantageous since food particles can get lodged in the holes and the crevices created by the screws in the holes. In order to solve this problem sometimes caps were placed over the holes to prevent contamination. Additionally, rotation of multiple screws or nuts in the prior art assemblies is labor intensive. Other prior art assemblies are labor intensive to manufacture due to the need to smoothly machine protruding screw ends.

SUMMARY OF THE INVENTION

In one aspect of the present invention a gauge plate assembly for a food slicer includes a first plate including a food product contacting side and an attachment side. The attachment side has a plurality of fixed mount studs extending therefrom in an established arrangement, the mount studs attached to the first plate in a non-through manner. A second plate includes a mount side which faces the attachment side of the first plate and has a plurality of stud receiving openings in a mirror image of the established arrangement of the plurality of mount studs for alignment therewith. The attachment side of the first plate is positioned adjacent the mount side of the second plate with the plurality of mount studs inserted within the plurality of stud receiving openings. The studs are secured within the stud receiving openings in a press fit engagement in order to hold the two plate together. This arrangement provides an assembled gauge plate which does not require protruding fasteners to be machined or sealed and otherwise reduces assembly costs.

In another aspect of the present invention a gauge plate for a food slicer includes a first plate and a second plate having a periphery which is a substantial mirror image to a periphery of the first plate. A plurality of stud fasteners are mounted to the periphery of the first plate and a plurality of bosses are formed in the periphery of the second plate, such that the position of the bosses corresponds to the position of the stud fasteners. The first and second plates are connected in a press-fit manner such that the plates are securely attached to one another and a cavity is created between the first and second plates.

In a further aspect of the present invention a method of manufacturing a multipiece gauge plate for a food slicer involves providing a first plate including a food product contacting side and an attachment side. A plurality of mount studs having a main shaft with a defined cross-length dimension are provided. The plurality of mount studs are attached to the attachment side of the first plate in a non-through manner to provide an established arrangement of the mount. A second plate including a mount side is provided. A plurality of stud receiving openings are formed on the mount side of the second plate in a mirror image of the established arrangement of the mount studs, each stud receiving opening having a defined cross-depth dimension which is different than the defined cross-length dimension of the mount studs. The attachment side of the first plate and the mount side of the second plate are positioned alongside each other with the plurality of mount studs aligned with the plurality of stud receiving openings. The first and second plates are then pressed together with a force sufficient to insert each mount stud into a respective aligned stud receiving opening in a press fit manner.

DETAILED DESCRIPTION

Figure 1:
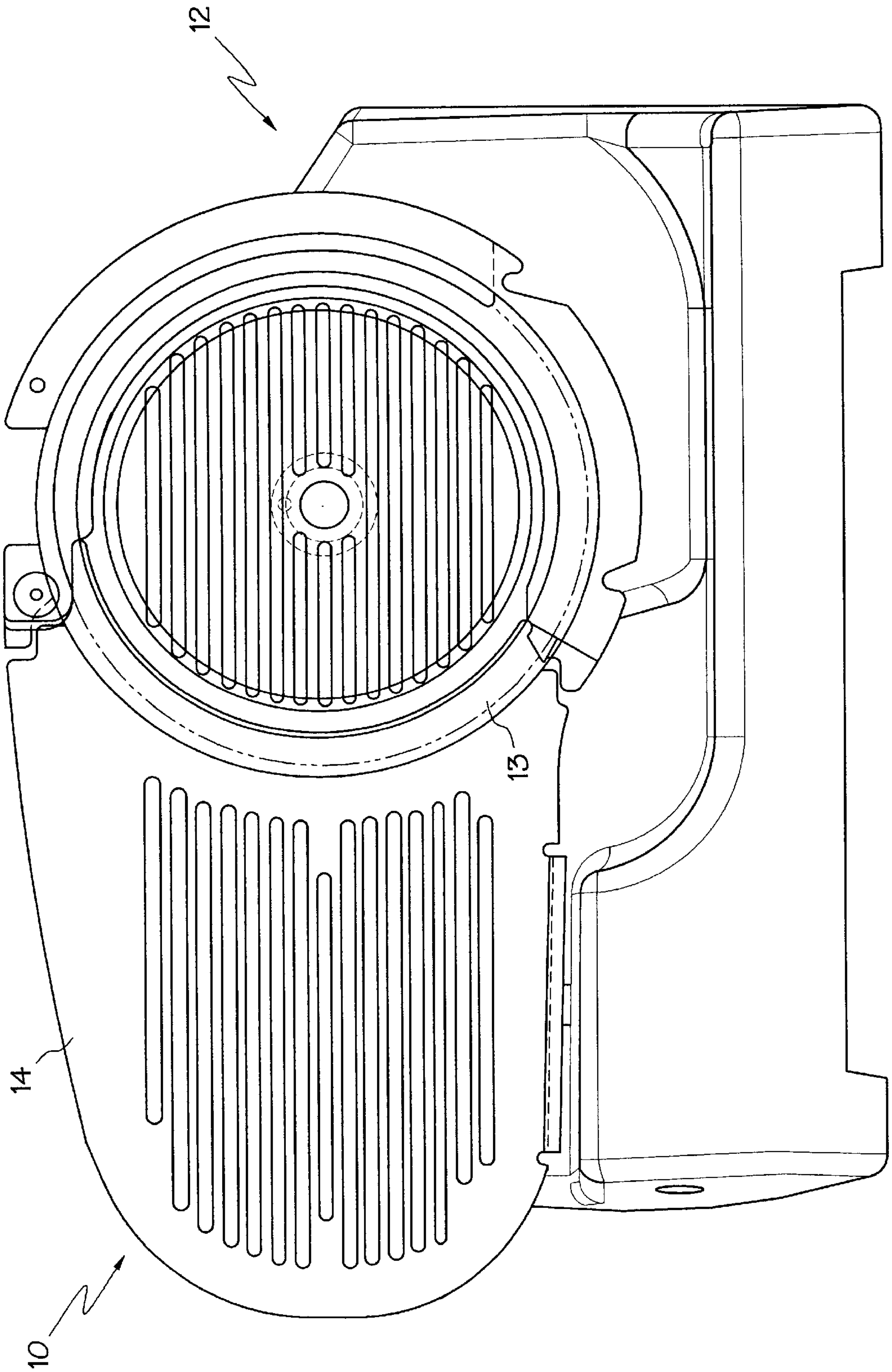
FIG. 1 shows a gauge plate of the present invention mounted on a food slicer.

A gauge plate for a reciprocating food product slicer, generally designated 10, in accordance with the present invention is shown in FIG. 1 as attached to the slicer 12 having a slicer blade 13. The gauge plate 10 includes a front plate 14 as shown in FIG. 1 and a rear plate 16, which acts as a support for the front plate, shown in FIG. 2.

The peripheral shape of the rear or support plate 16 shown in FIG. 2A, is a substantial mirror image to the front plate 14 shown in FIG. 1. The gauge plate 10 includes a plurality of fasteners around the circumference thereof. Preferably the fasteners are studs 104 (FIG. 2B) which extend from either plate 14 or support plate 16 substantially perpendicular to the plane of the gauge plate. Associated bosses 17 extend from the opposite plate such that the bosses are shaped to receive the studs. Seven bosses are shown here, but any number may be used which will adequately hold plate 14 and support plate 16 together. The bosses 17 correspond to the positioning of the studs such that the studs can be inserted into the bosses 17. The studs are slightly larger in diameter than the holes in the bosses 17 such that the plates are held together in a press-fit.

The gauge plate 10 is described as being attached with studs which are press-fit into holes. A polyurethane seal (indicated by line 5) may be formed between the front 14 plate and support 16 plate along the mating periphery of such plates so as to seal the gauge plate 10 from any juices or other food contaminants.

Figure 2:
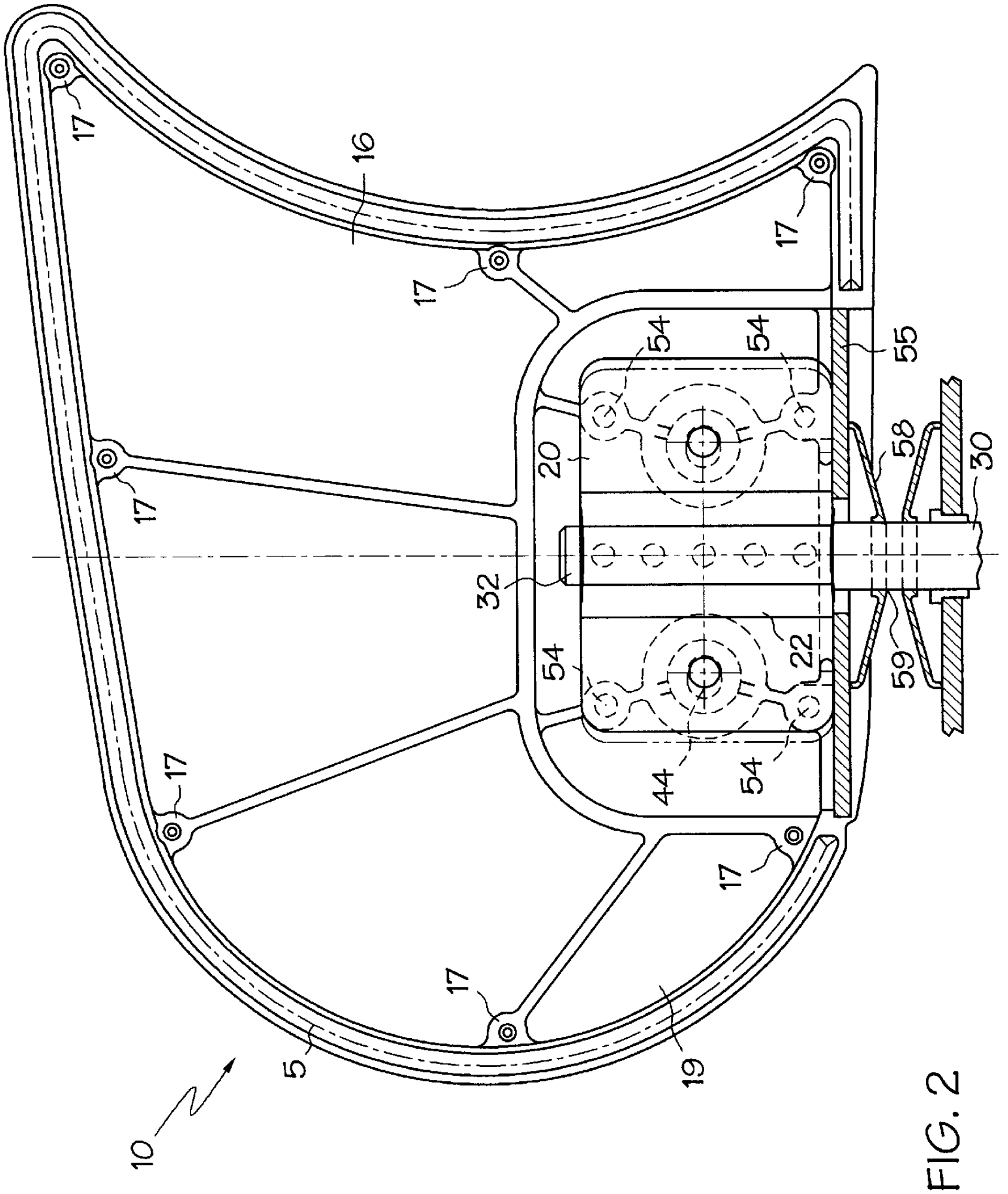
FIG. 2A shows the gauge plate of FIG. 1 with the front plate removed.
FIG. 2B shows a partial cross-sectional view of the attachment portions of the plates of the gauge plate.
FIG. 2C shows an enlarged partial side view of a mount stud and corresponding plate.
FIG. 2D shows an enlarged side view of an alternative mount stud.
FIG. 2E is an enlarged view of a threaded attachment opening.
Figure 2B:
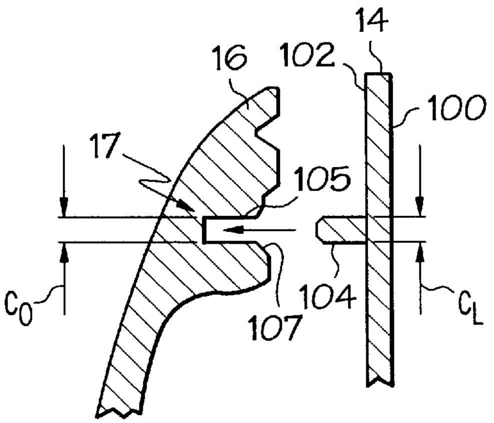

As shown in FIG. 2B, plate 14 includes a food product contacting side 100 and an attachment side 102. Mount studs 104 extend from the attachment side of the plate 14 toward support plate 16, with the two plates being shown in an unassembled form in FIG. 2B. Importantly, mount studs 104 are attached to plate 14 in a non-through manner as shown so as to facilitate a smooth surface on food product contacting side 100 opposite each mount stud 104. As compared to arrangements in which fasteners pass through the plate 14, the arrangement of the present invention provides for a smooth surface on food product contacting side 100 opposite each mount stud 104 facilitating easier cleaning of food product contacting side 100.

Boss or stud receiving opening 17 is also shown in support plate 16 and a plurality of such openings 17 are provided for each respective mount stud 104 as previously described. Assembly of the gauge plate 10 involves positioning plate 14 and support plate 16 generally as shown such that mount studs 104 align with stud receiving openings 17 allowing the plates 14 and 16 to be pressed together with a force sufficient to insert each mount stud 104 into a respective aligned stud receiving opening 17. In this regard, to securely attach the two plates together it is preferred that a cross-length dimension of each mount stud 104 (for example, the outer diameter in the case of rounded studs) be slightly greater than a cross-depth dimension of each respective stud receiving opening 17 (for example, the inner diameter of the opening in the case of rounded openings). This arrangement allows the plates 14 and 16 to be attached together in a press fit manner to securely hold the plates together.

Further, because many embodiments will utilize a number of mount studs 104 and corresponding stud receiving openings 17, seven being shown in the illustrated embodiment, it is preferred that each stud receiving opening include a securing portion 105 which will engage the stud, and an entry portion including a chamfer 107 which tends to direct the mount stud 104 into the securing portion 105. Another feature considered advantageous in multiple stud embodiments is that only a portion of each mount stud can be inserted into a respective opening 17 even when plate 14 is pressed fully against support 16, permitting each stud 104 to bend slightly relative to attachment side 102 of plate 14. This structural feature compensates for potential small misalignments between mount studs 104 and stud receiving openings 17 which might otherwise prevent plate 14 and support plate 16 from being pressed together. In particular, in the case of such a misalignment, the chamfer 107 will tend to direct the mount stud 104 toward the securing portion 105 opening and, if necessary, will cause the mount stud to bend an amount sufficient to allow it to be inserted into the securing portion 105 of the opening 17. In embodiments including stud receiving openings 17 with both a securing portion 105 and a chamfer 107, it is recognized that the cross-length dimension of the mount stud 104 should be slightly greater than the cross-depth dimension of the securing portion 105 of the opening 17.

Figure 2C:
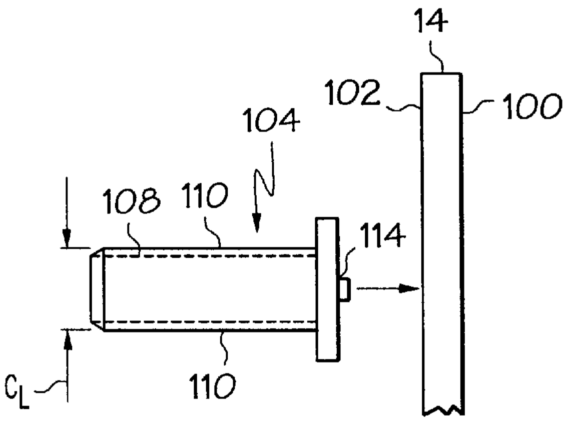
Figure 2D:
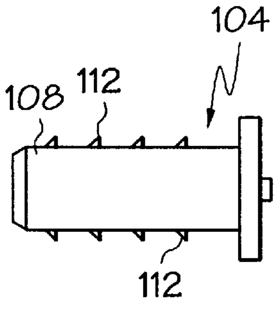
Figure 2E:
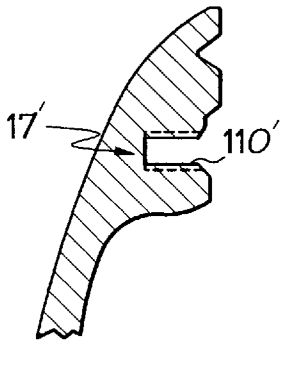

Referring now to FIG. 2C, an enlarged partial side view of a mount stud 104 relative to plate 14 is shown. The mount stud 104 includes a main shaft 108 generally depicted by the dashed lines and the cross-length dimension of the stud 104 is defined relative to a deformable extension 110 formed along the length of main shaft 108. In the preferred embodiment, each stud 104 is threaded and the deformable extension 110 is formed by the thread ridge which extends about the main shaft 108 of the stud 104. However, it is recognized that other types of deformable extensions could be provided on the stud such as the barb elements 112 depicted in FIG. 2D. Referring again to FIG. 2C, each stud 104 includes a small projection 114 at the end thereof which enables the stud to be attached to plate 14 using a resistance or spot welding technique in which projection 114 melts and causes the stud 104 to attach to side 102 of plate 14. While the illustrated preferred embodiment incorporates mount studs 104 with a main shaft 108 and deformable extension 110', it is recognized that the mount studs could be formed with a smooth shaft and that deformable extensions could be provided as shown in FIG. 2E within the stud receiving openings 17' with the cross-depth dimension of each opening 17' then being defined relative to the deformable extensions thereon.

Use of deformable extensions in some fashion is preferred because it is difficult to produce studs 104 and openings 17 with precise tolerances. In such cases the studs 104 may be too large to fit within the openings or too small to form a press-fit attachment. The deformable extension 110 allows the studs 104 to be formed sufficiently large to assure a press-fit attachment is achieved, the extensions compressing inward toward the main shaft 108 upon insertion into an opening 17, or in the case of extensions formed within the openings 17, the extensions compressing outward upon insertion of a stud 104 within the opening 17.

Figure 3:
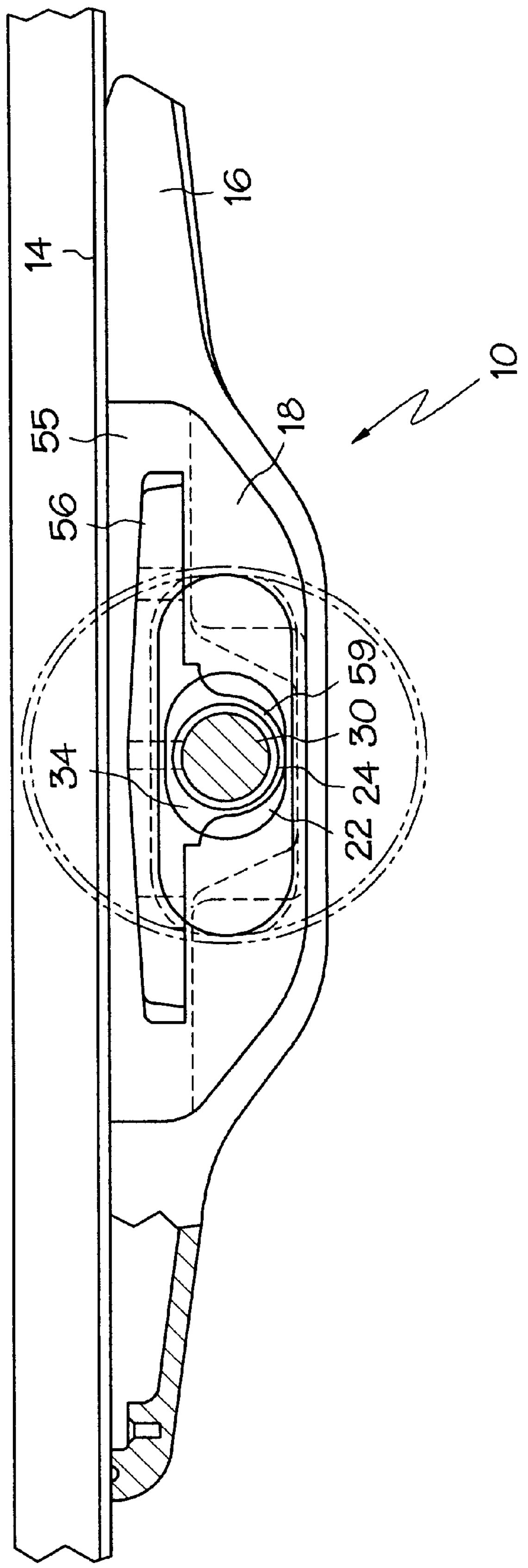
FIG. 3 shows a cross-sectional view of the gauge plate of FIG. 1.

While the front plate 14 is typically planar, the support plate 16 of the gauge plate 10 is concave as shown in FIG. 3, to add rigidity to the plate 14 when attached thereto and so that when the front 14 plate and support plate 16 are put together they define a cavity 18 there between and an opening on the bottom of the gauge plate leading to the cavity. The gauge plate 10 is removably mounted on the slicer 12 by means of an adjustment plate 20, which is mounted to the slicer base 12 and fits in the cavity 18 between the front 14 and rear 16 plates.

Figure 4:
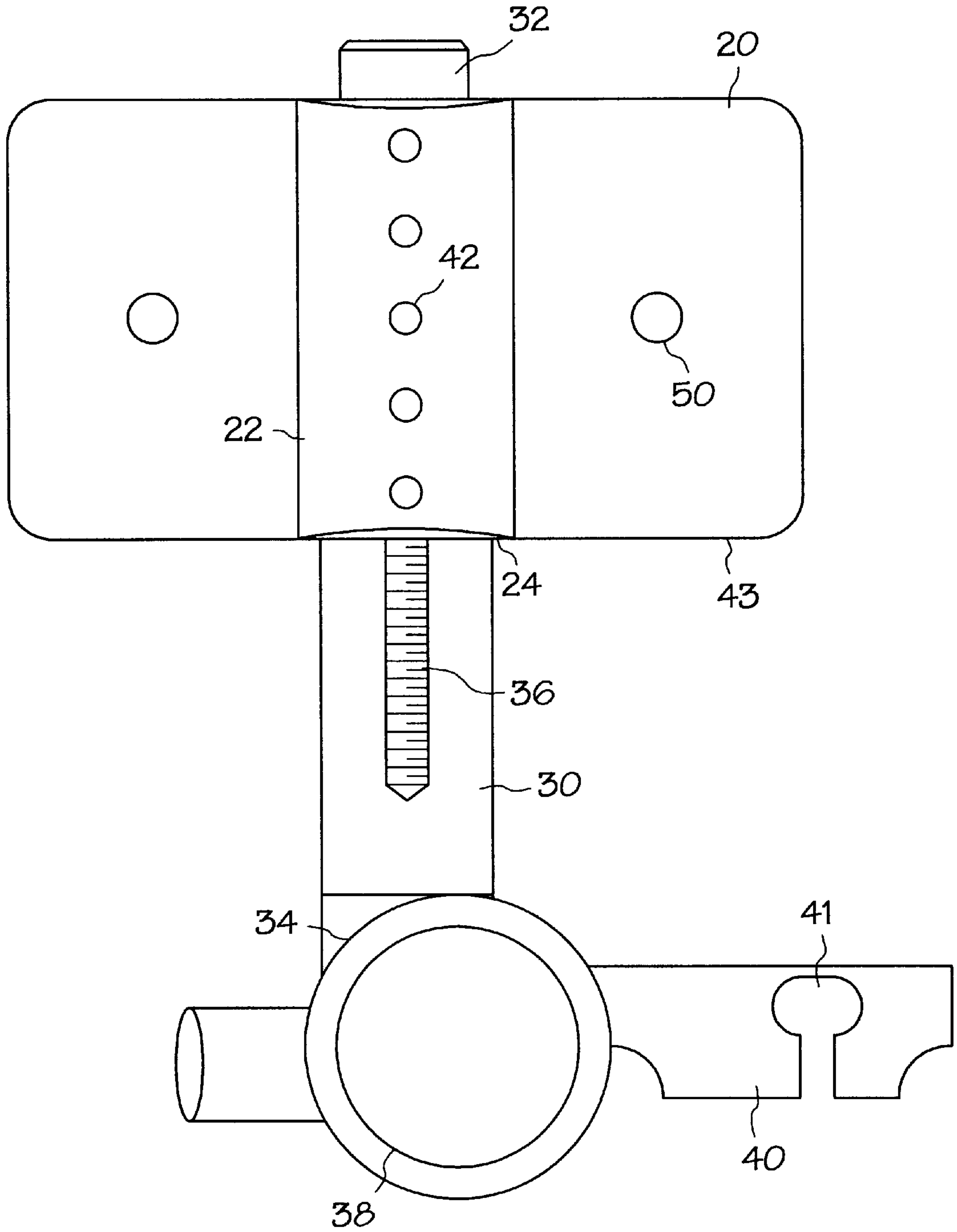
FIG. 4 shows the adjustment plate and indexing rod of the present invention.

The slicer includes an indexing rod 30 (FIG. 4) which is attached on a first end 32 to the adjustment plate 20 and to the indexing mechanism (not shown) of the slicer base on its second end 34. The indexing mechanism is conventional, and adjusts the position of the gauge plate 10 relative to the slicer blade 13 for the desired thickness of cut of the food product. As shown in FIG. 4, rod 30 is substantially cylindrical in shape and has a groove 36 therein. The terminal end 34 of the rod includes a cylindrical boss 38 and an extending projection 40 having a slotted hole 41 for mounting the indexing rod 30 to the gauge plate adjustment mechanism.

The adjustment plate 20 as shown in FIG. 4, is made of any sturdy material, such as cast aluminum. It is generally rectangular in shape and includes a sleeve 22 on the back thereof. The sleeve 22 is integral with the rectangular portion and includes a bore 24 down its length for insertion of the indexing rod 30.

The adjustment plate 20 further includes a plurality of holes 42 on the sleeve 22 which are aligned with the groove 36 in the indexing rod such that when the indexing rod 30 is inserted in the sleeve 22, a plurality of screws inserted in the holes 42 can be tightened down into the groove 36 and "lock" the adjustment plate 20 in a fixed manner relative to the rod 30.

The adjustment plate 20 also includes two through threaded holes 50, one on either side of the sleeve. These holes should be at the same distance from the top edge 43 of the plate 20.

As shown in FIG. 2, the lower portion 19 of the rear plate 16 of the gauge plate is also provided with two elongated, e.g. elliptical slots 44 which align with the through holes 50 of the adjustment plate 20 as will be described hereinbelow, and four small holes 54 which are positioned one above and one below each of the elliptical slots 44 for insertion of four set screws (not shown). These smaller holes 54 will align with the four corners of the adjustment plate within the gauge plate.

As shown in FIG. 3 a flat plate 55 is mounted to the bottom of the gauge plate 10. This seals the gauge plate so that it is more difficult for food, juices, or other contaminants to get inside the gauge plate. The flat plate 55 includes an elongate slot 56 therein for the adjustment plate 20 to slide as the gauge plate is adjusted relative to the slicer base. In addition, FIG. 2 shows an oblong cup 58 which is press-fit onto the indexing rod 30. It acts to seal off the slot 56 as well as providing support for the flat plate 55. The oblong cup 58 has a hole 59 in the center thereof for insertion of the indexing rod 30.

The indexing rod 30 is fixed to the slicer 12 and the adjustment plate 20 is fixed by means of screws passed through the holes 42 to the rod 30. The front 14 and rear plates 16 are sealed together so that there is a bottom opening leading to the cavity 18 and the gauge plate 10 is adjustably mounted over the adjustment plate 20 and attached by threaded fasteners.

The two bolt holes 50 through the width of the adjustment plate 20 are threaded. Thereby, when the adjustment plate is inserted in the cavity 18 between the two plates 14, 16 of the gauge plate, the two holes 50 align with the elliptical slots 44 in the plate 16.

The front plate 14 of the gauge plate should be adjusted to be substantially parallel to the slicing blade 13 such that when the indexing member is in the zero position, the front face of the gauge plate is flush with, or preferably approximately 0.020 inches from, the knife edge. To adjust the position of the gauge plate with respect to the adjustment plate, the bolts are slid within the elliptical slots 44.

To align the front face 14 of the gauge plate with the knife edge, a set of fasteners (bolts) are first loosely inserted through gauge plate holes 44 into adjustment plate holes 50. Then a straight edge is held against the blade of the knife 13 and the front plate 14. The gauge plate is then slidably adjusted by means of moving the elliptical slots 44 with respect to the bolts. The faces of the blade and gauge plate are substantially aligned by adjusting the set screws located in the holes 54, after which the bolts in the slots 44 are tightened. To adjust for any deviation in the pitch, yaw or planar alignment of the gauge plate 10 with respect to the knife 13, four set screws are provided through holes 54 in the back plate 16 of the gauge plate 10. The set screws abut the face of the adjustment plate 20 near the corners thereof. Since the gauge plate has been fixed to the adjustment plate by means of the bolts, selective adjustment of the individual set screws will move or tilt that quadrant of the adjustment plate and thus the gauge plate in a forward or backward direction with respect to the knife. After the set screws are fixed, the fasteners in the slots 44 are securely tightened.

When the bolts are loosened, the gauge plate 10 may be moved toward or away from the blade 13 (left or right as the slicer is shown in FIG. 1), up and down (as the slicer is shown in FIG. 1), as well as toward or away from the operator (in or out of the page as the slicer is shown in FIG. 1). Furthermore, the gauge plate may be rotated with three degrees of freedom, thereby providing a total of six degrees of freedom of movement for the gauge plate.

Since the bolt slots 44 on the gauge plate 10 are elliptical, the entire gauge plate may be adjusted with respect to the adjustment plate when the bolts are loosened by shifting the gauge plate to either side, up or down. This is especially useful since, as the blade wears, it becomes slightly smaller and the gauge plate can be moved laterally inward with respect to the knife edge to close any gap that may develop over time. The four set screws in holes 54 provide the gauge plate with several additional degrees of movement.

Figure 5:
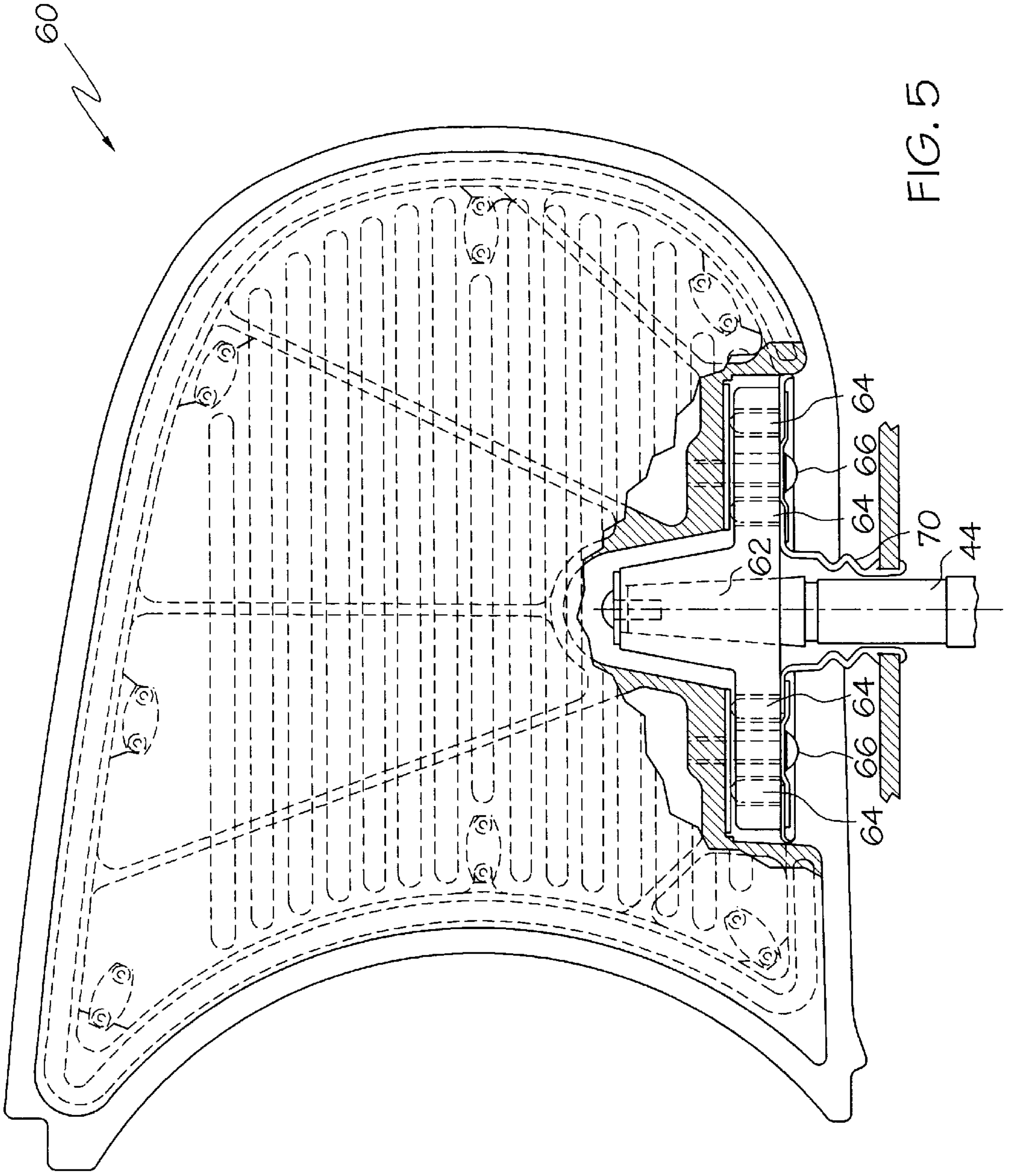
FIG. 5 shows an alternative adjustable gauge plate of the present invention.

An alternative adjustment means for the gauge plate 60 is shown in FIG. 5. In this embodiment, the rectangular adjustment plate 20 of FIG. 2 is replaced by a T-shaped member 62. This T-shaped member mounts to the slicer on a bracket. The T-shaped member includes four set screws 64 and two bolts 66 similar to the embodiment shown in FIG. 2. However, these fasteners are adjusted on the bottom of the plate in the hole to the cavity 18 instead of on the back of the plate as in the previous embodiment. Additionally, a flexible rubber shield 70 can be used to prevent food debris and juices from contacting the T-shaped adjustment member or contaminating inside of the gauge plate.

Having described the invention in detail and by reference to preferred embodiments thereof, it will be apparent that modifications and variations are possible without departing from the scope of the invention.

What is claimed is:

1. A gauge plate for a food slicer comprising:

a first plate;

a second plate having a periphery which is a substantial mirror image to a periphery of said first plate;

a plurality of stud fasteners mounted to said periphery of said first plate;

a plurality of bosses mounted to said periphery of said second plate, such that the position of said bosses corresponds to the position of said stud fasteners, wherein said first and second plates are connected via press fit insertion of said studs into said bosses such that said plates are securely attached to one another and a cavity is created between said first and second plates.

2. The gauge plate of claim 1 wherein said studs are threaded and the threads deform when said studs are pressed into said bosses.

3. The gauge plate of claim 1 further comprising a seal between said first and second plates to seal the gauge plate along the periphery thereof.

4. The gauge plate of claim 1 further comprising a bottom plate which is mounted between said first and second plates to enclose said cavity formed by the joining of said first and said second plates.

5. The gauge plate of claim 1 further comprising a cup which is mounted below said gauge plate to support said bottom plate.

6. A gauge plate assembly for a food slicer comprising:

a first plate including a food product contacting side and an attachment side, the attachment side including a plurality of fixed mount studs extending therefrom in an established arrangement, the mount studs attached to the first plate in a non-through manner;

a support plate including a mount side which faces the attachment side of the first plate, the attachment side having a plurality of stud receiving openings for alignment with the mount studs; and wherein the attachment side of the first plate is positioned adjacent the mount side of the support plate with the plurality of mount studs inserted within the plurality of stud receiving openings, the studs being secured within the stud receiving openings in a press fit engagement.

7. The gauge plate assembly of claim 6 wherein each of said mount studs includes a main shaft having at least one deformable extension formed at at least one position along a length of the main shaft, the deformable extension of each mount stud being compressed toward the main shaft upon insertion into its mating stud receiving opening by engagement with an inner surface portion thereof.

8. The gauge plate assembly of claim 7 wherein each of said deformable extensions comprises a ridge extending from the main shaft.

9. The gauge plate assembly of claim 8 wherein each of said ridges comprises a thread ridge extending about the main shaft along at least a portion of its length.

10. The gauge plate assembly of claim 7 wherein each of said deformable extensions comprises a barb element extending from the main shaft.

11. The gauge plate assembly of claim 6 wherein an outer peripheral shape of the first plate matches an outer peripheral shape of the support plate.

12. The gauge plate assembly of claim 11 wherein the plurality of mount studs are positioned along an outer peripheral edge of the first plate.

13. The gauge plate assembly of claim 12 further comprising a sealant between the first plate and the support plate along outer peripheral edge portions of the plates.

14. The gauge plate assembly of claim 6 wherein each of said stud receiving openings is threaded, and a pre-assembly cross-depth dimension of each stud receiving opening defined relative a thread ridge thereabout is less than a pre-assembly cross-length dimension of each mount stud so that said thread of each stud receiving opening deforms as said respective stud is pressed therein.

15. The gauge plate assembly of claim 14 wherein main shaft of each mount stud is smooth.

16. The gauge plate assembly of claim 14 wherein the main shaft of each mount stud is threaded, and the pre-assembly cross-length dimension of each mount stud is defined relative to a thread ridge therearound.

17. The gauge plate assembly of claim 6 wherein each stud receiving opening includes an entry portion having a chamfer for directing its respective mount stud into a securing portion thereof.

18. The gauge plate assembly of claim 17 wherein only a portion of each mount stud is inserted into the securing portion of its respective stud receiving opening to permit the mount stud to bend at least a limited amount upon insertion.

19. A method of manufacturing a multi-piece gauge plate for a food slicer comprising:

providing a first plate including a food product contacting side and an attachment side;

providing a plurality of mount studs having a main shaft with a defined crosslength dimension;

attaching the plurality of mount studs to the attachment side of the first plate in a non-through manner to provide an established arrangement of the mount studs;

providing a support plate including a mount side;

forming a plurality of stud receiving openings on the mount side of the support plate in a mirror image of the established arrangement of the mount studs, each stud receiving opening having a defined cross-depth dimension which is different than the defined cross-length dimension of the mount studs;

positioning the attachment side of the first plate and the mount side of the support plate along side each other with the plurality of mount studs aligned with the plurality of stud receiving openings; and pressing the first plate and the support plate together with a force sufficient to insert each mount stud into a respective aligned stud receiving opening in a press fit manner.

20. The method of claim 19 wherein the defined cross-length dimension is greater than the defined cross-depth dimension, the defined cross-length dimension being defined relative to a deformable extension formed on the main shaft, and wherein in the pressing step the deformable extension of each mount stud is compressed toward the main shaft upon insertion into its respective stud receiving opening.

21. The method of claim 19 wherein said attaching step involves resistance welding each mount stud to the attachment side of the first plate.

* * * * *